United States Patent [19]
Stephenson et al.

[11] Patent Number: 6,062,332
[45] Date of Patent: May 16, 2000

[54] HYDROSTATIC VEHICLE DRIVE SYSTEM HAVING IMPROVED CONTROL THEREOF

[75] Inventors: Dwight B. Stephenson, Burnsville; Richard R. Lyman, Jr., Chaska, both of Minn.

[73] Assignee: Eaton Corporation, Cleveland, Ohio

[21] Appl. No.: 09/149,323

[22] Filed: Sep. 8, 1998

[51] Int. Cl.⁷ .................................................. B60K 17/356
[52] U.S. Cl. .................... 180/305; 180/307; 180/308; 180/6.3; 180/417; 180/421; 180/422
[58] Field of Search .................... 180/305, 307, 180/308, 6.3, 417, 421, 522

[56] References Cited

U.S. PATENT DOCUMENTS

| | | | |
|---|---|---|---|
| 3,915,068 | 10/1975 | Gassman | 91/420 |
| 4,914,592 | 4/1990 | Callahan et al. | 180/424.05 |
| 5,147,010 | 9/1992 | Olson et al. | 180/197 |
| 5,427,195 | 6/1995 | Paul et al. | 180/308 |
| 5,715,664 | 2/1998 | Sallstrom et al. | 56/7 |
| 5,720,360 | 2/1998 | Clark et al. | 180/305 |

*Primary Examiner*—Christopher P. Ellis
*Assistant Examiner*—Rashmi Sharma
*Attorney, Agent, or Firm*—L. J. Kasper

[57] ABSTRACT

A method of controlling a vehicle hydraulic drive system of the type including a plurality of fluid pressure actuated wheel motors (13,15) connected in a parallel circuit with a source (17) of pressure. A flow restrictor valve (65) is disposed in a downstream conduit (27) of each of the wheel motors (13,15). The method involves determining the theoretical fluid flow for each motor, the actual fluid flow through each motor, and generating an error signal (107) which is then used to bias the restrictor valve (65) toward a flow restriction position. The disclosed method can be used to achieve steering at greater than kinematic, by scrubbing the inside front wheel, or can be used to prevent wheel slip of propulsion wheels, or can be used to prevent scrubbing of a wheel during hydrostatic braking, or can even be used to achieve vehicle steering.

15 Claims, 5 Drawing Sheets

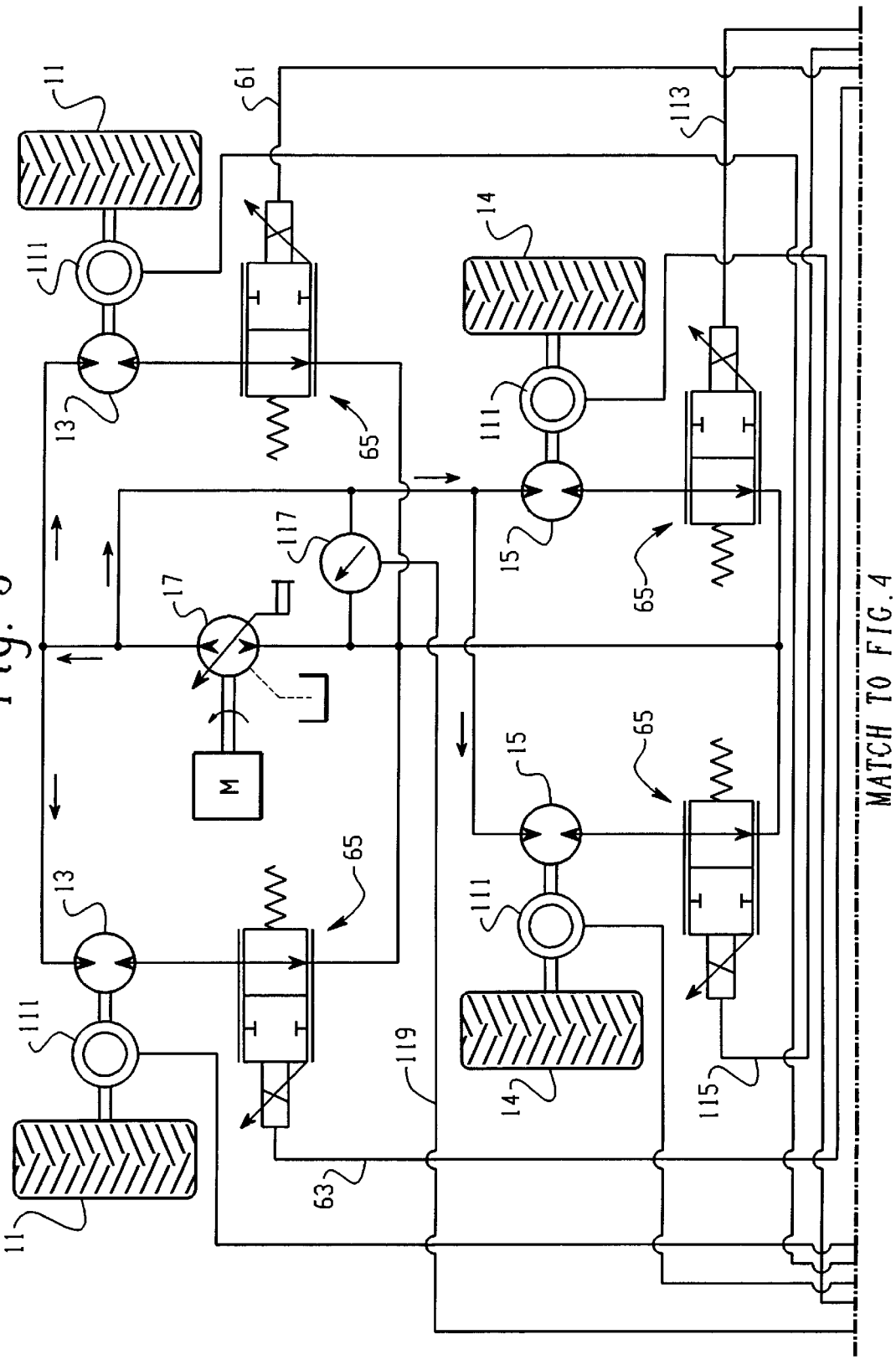

HYDROSTATIC VEHICLE DRIVE SYSTEM HAVING IMPROVED CONTROL THEREOF

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a hydraulic (hydrostatic) vehicle drive system, and more particularly, to such a system for use in driving a pair (or pairs) of driven wheels from a single fluid source.

Many vehicles of the "off-highway" type are propelled by a hydraulic (hydrostatic) drive system wherein the drive (propel) wheels of the vehicle are directly driven by fluid pressure actuated hydraulic motors. Typically, such propel motors are either of the axial piston type, or of the radial piston (cam lobe) type, or of the gerotor type, although those skilled in the art will understand that the particular type of propel motor is not a significant feature of the present invention.

On some vehicles of the hydrostatic propel type, each wheel motor receives pressurized fluid from its own respective pump. On such a vehicle, an example of which would be a "skid steer loader", steering may be accomplished rather easily by reversing the direction of operation of the pump and motor on the side of the vehicle about which it is desired to effect a pivoting, steering movement.

However, on many vehicles of the hydrostatic propel type, there is only a single pump for the propel system, and the wheel motors form a parallel circuit, fed by the single pump. In a one pump, two (or four) motor propel system, performing very tight turns (small turning radius) is not as easy as in a vehicle such as a skid steer loader. An example of the type of vehicle to which the present invention relates is a large combine having a pair of front hydrostatic drive motors and a pair of rear hydrostatic drive motors. The front motors drive wheels which are not typically steerable, but can be, whereas the rear motors provide drive torque to wheels which are usually mounted on a steerable axle. The steerable axle is typically steered by means of a steering cylinder, with flow to and from the cylinder being controlled by a full fluid linked steering control unit (SCU), as is well known to those skilled in the art.

For any particular vehicle and drive system, there is a particular "kinematic" steering geometry which is possible, i.e., the smallest possible turning radius in which all of the wheels remain in rolling engagement with the ground, with no slipping or scrubbing at any wheel. On many vehicles, achieving kinematic steering provides an acceptable turning radius, but there are certain vehicles, such as certain large combines for which the vehicle manufacturers and operators find it desirable to be able to steer the vehicle (having one pump, and two driven wheels) in a turning radius which is even smaller than the kinematic radius. As is understood by those skilled in the art, the only way to achieve a turning radius less than kinematic is for one of the steerable wheels to scrub, i.e., to rotate slower than the vehicle is moving, thus resisting the vehicle forward motion on that side.

Unfortunately, it has been determined that, in order to achieve the desirable smaller turning radius, it is necessary to restrict the flow through the motor, on the downstream side of the motor, and providing such a restriction causes a back-pressure on the upstream side of the motor. The result of this back-pressure can include increasing the pressure at the inlet of the other motor (i.e., in the parallel combination of motors), and reducing the life of the various hydraulic components in the system. Another problem with simply restricting the oil flow upstream or downstream of the motor is that adequate reverse torque of the motor is not achieved. If the restriction is imposed upstream of the motor, no reverse torque is achieved. A downstream restriction does achieve reverse torque, but such reverse torque is limited by the inlet pressure or the pressure at the other propel motors, which can increase system pressure as noted previously.

As is well known to those skilled in the art, there are various other operating problems which arise in hydrostatic vehicle drive systems. On certain vehicle applications, such as turf equipment, a wheel may lose traction and "spin-out", causing damage to the lawn area on which the vehicle is traveling. On certain other vehicle types on which hydrostatic braking is used, going down hill can cause a pressure reversal on the pump and motors, and as the weight of the vehicle shifts forward, a loss of traction at one or both of the rear wheels can result in "scrubbing" of those wheels.

BRIEF SUMMARY OF THE INVENTION

Accordingly, it is an object of the present invention to provide an improved hydrostatic vehicle drive system for driving two or more driven wheels which overcomes the above described problems.

It is a more specific object of the present invention to provide an improved vehicle hydraulic drive system for driving a pair of driven wheels to achieve a vehicle turning radius which is less than the kinematic turning radius.

It is another object of the present invention to provide an improved drive system which accomplishes the above-stated objects without the need for substantial, additional drive system components which would add substantial cost and complexity to the system.

It is still another object of the present invention to provide an improved drive system which accomplishes the above-stated objects, and which is able to do so in response to sensing the occurrence of at least a predetermined minimum steered angle of the vehicle.

The above and other objects of the invention are accomplished by the provision of a method of controlling a vehicle hydraulic drive system of the type comprising a source of pressurized fluid, and a plurality of fluid pressure actuated motors connected in a parallel circuit with the fluid source. A driven wheel is drivingly associated with each of the motors whereby the driven wheels are driven at varying speeds in response to varying rates of fluid flow to each of the motors. The vehicle includes and a source of control fluid pressure. Each of the motors includes an inlet conduit disposed upstream of the motor, and an outlet conduit disposed downstream of the motor when the vehicle is moving in a normal forward direction.

The improved method of control is characterized by providing a proportional flow restrictor valve disposed in the outlet conduit of each of the plurality of motors. The method includes determining the theoretical fluid flow for each of the motors, the cumulative theoretical fluid flow for all of the motors, and the instantaneous theoretical fractional flow for each of the motors. The next step is determining the actual fluid flow through each of the motors driving one of the driven wheels. Next is calculating a wheel flow error for each of the driven wheels representative of the difference between the theoretical fluid flow for each of the motors and the actual fluid flow through each of the motors. The last step is generating a pilot signal representative of the wheel flow error, and transmitting the pilot signal to the restrictor valve biasing the restrictor valve from a normal position providing relatively little flow restriction, toward a flow restriction position.

BRIEF DESCRIPTION OF THE DRAWINGS

FIG. 5 is a hydraulic schematic of a wheel motor control system, illustrating an alternative embodiment of the present invention.

DETAILED DESCRIPTION OF THE PREFERRED EMBODIMENT

Figure 1:
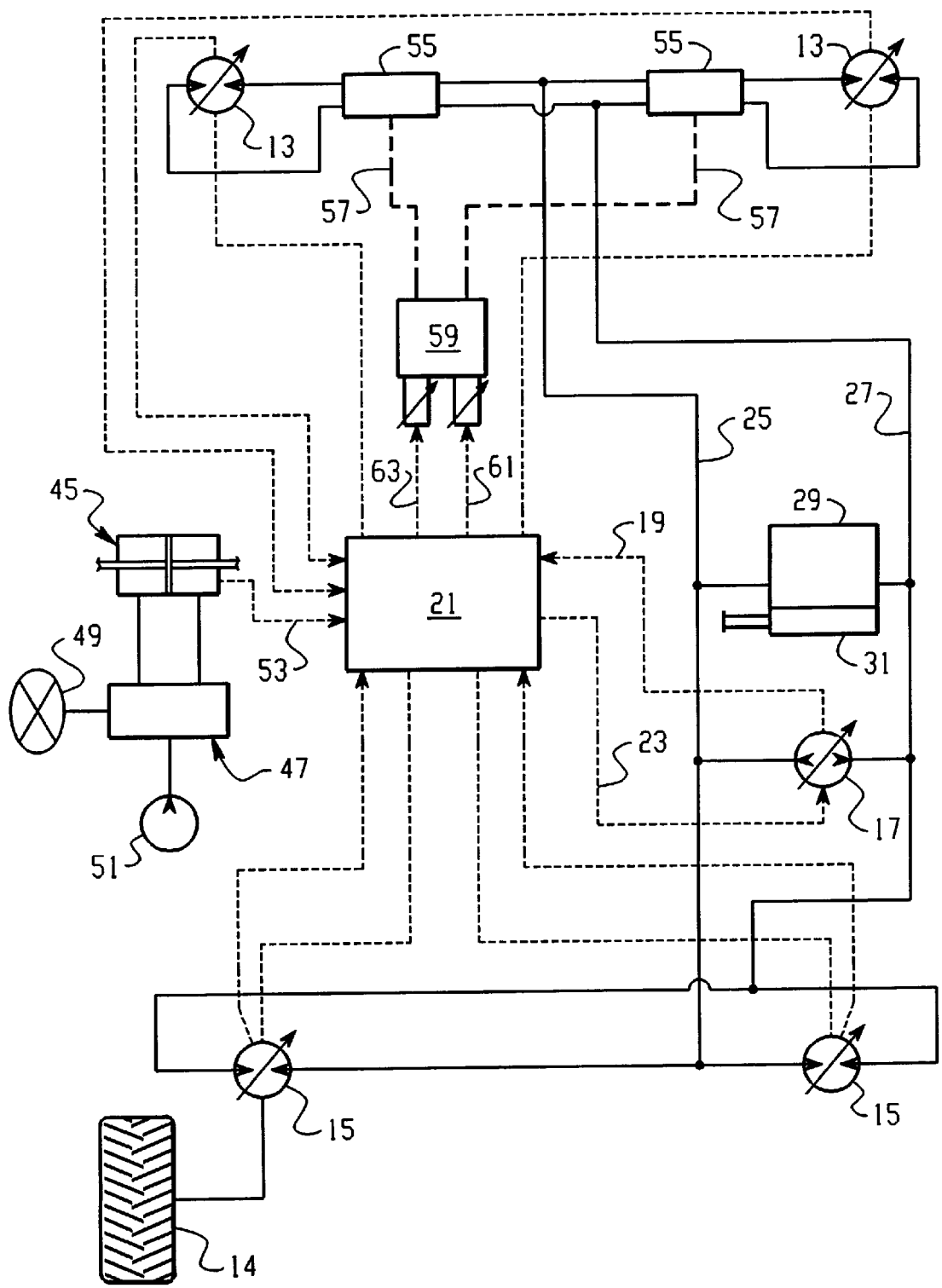
FIG. 1 is an overall schematic of a vehicle drive system of the type to which the present invention relates.

Referring now to the drawings, which are not intended to limit the invention, FIG. 1 illustrates a schematic of a vehicle drive system in which solid lines represent hydraulic conduits, and dashed (or dotted) lines can represent either hydraulic pilot signals, or electrical signals, including signals from sensors. It should be noted that in the schematic of FIG. 1, in many cases, the sensor itself is not illustrated, but only the signal from the sensor.

The schematic of FIG. 1 relates to a vehicle of the type having a pair of front drive wheels 11 (not shown in FIG. 1, and only one of the wheels 11 being shown in FIG. 2), the wheels 11 being driven by a pair of hydraulic drive motors 13. The vehicle also includes a pair of rear drive wheels 14 (only one of which is shown in FIG. 1), driven by a pair of hydraulic drive motors 15.

The front drive motors 13 are connected in parallel and receive pressurized fluid from a variable displacement pump 17. Similarly, the rear drive motors 15 are connected in parallel, and also receive pressurized fluid from the pump 17. The variable displacement pump 17 has its displacement sensed and transmitted by means of a signal line 19 to a vehicle controller 21 which in turn, transmits a pump displacement command signal 23 to the pump 17.

The pump 17 communicates with the motors 13 and 15 by means of a pair of system conduits 25 and 27. Connected in parallel between the conduits 25 and 27 is a conventional valve package, including a shuttle and cross-over relief valve 29 and a towing valve 31, both of which are well known to those skilled in the art, form no part of the invention, and will not be described further herein.

Although not shown in detail herein, the rear drive motors 15 are part of a steerable axle assembly, in the embodiment of FIG. 1, the steering angle of which is controlled by a steering cylinder 45. The position of the cylinder 45 is controlled hydraulically by a full fluid linked steering control unit (SCU) 47 in response to rotation of a steering wheel 49. The SCU 47 receives pressurized fluid from a source, shown herein as a fixed displacement pump 51. The position of the steering cylinder 45 is sensed and communicated to the vehicle controller 21 by means of a signal line 53. Alternatively, the steering angle represented by the signal 53 could be taken directly from the steering wheel 49, i.e., by way of a steering wheel position sensor.

Associated with each of the front drive motors 13 is a motor control valve 55 which includes valving both upstream and downstream of the motor 13, as will be described in greater detail in connection with FIG. 2. Referring still to FIG. 1, each motor control valve 55 receives a pilot signal 57 from a pilot valve assembly 59, in response to a pair of input signals 61 and 63 from the vehicle controller 21. In the subject embodiment, and by way of example only, whenever the vehicle controller 21 becomes aware that the vehicle is being steered at a predetermined minimum steering angle, as represented by the signal 53, the controller 21 actuates either the input signal 61 or the input signal 63, depending upon which of the front wheels is the "inside" wheel and which is the "outside" wheel during the turn. The inside wheel is the one about which the vehicle pivots or turns during the turning of the vehicle, i.e., during the deviation of the vehicle from the normal, straight ahead movement. If, by way of example only, a right turn is being effected, the input signal 61 is energized and a pilot signal 57 is communicated to the motor control valve 55 which controls the flow of fluid to and from the front drive motor 13 on the right side of the vehicle. It should be noted that in FIG. 1, when the vehicle is moving forward, the schematic moves up the page.

Figure 2:
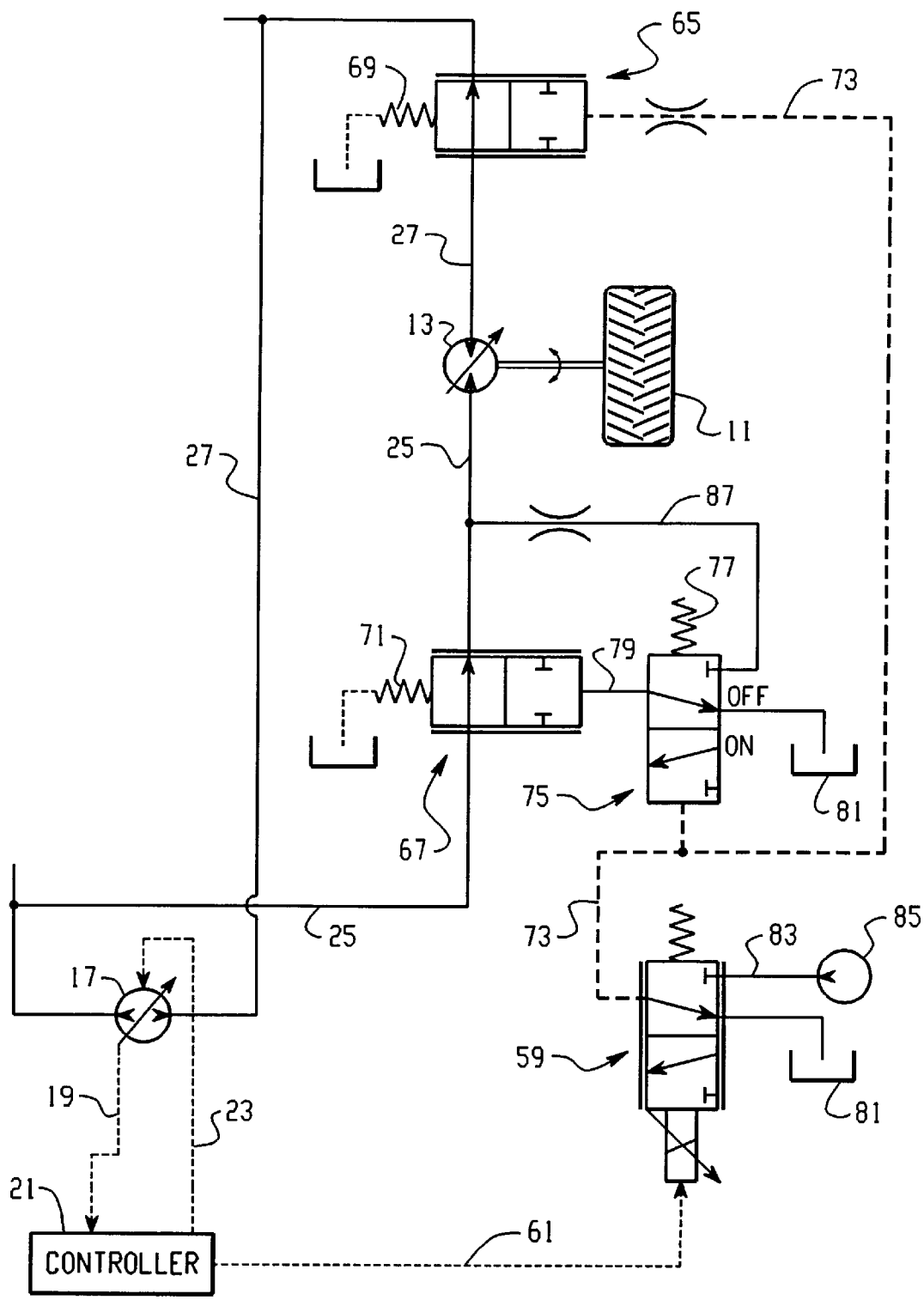
FIG. 2 is a hydraulic schematic of a wheel motor control system, illustrating the present invention.

Referring now primarily to FIG. 2, which includes only parts of the system of FIG. 1, the contents of the motor control valve 55 will be described in detail. For purposes of further description, the system conduit 25 will be considered the inlet conduit, and the system conduit 27 will be considered the outlet conduit, with the vehicle moving forward (up the page in FIG. 2) and turning to the right (in both FIGS. 1 and 2).

Included within the motor control valve 55 is a proportional restrictor valve 65 disposed in the outlet conduit 27, and a pressure reducing valve 67 disposed in the inlet conduit 25. The restrictor valve 65 is biased by a spring 69 toward the position shown in FIG. 2 which comprises the "normal" position of the restrictor valve 65, in which it provides relatively little restriction to fluid flow through the conduit 27. Similarly, the pressure reducing valve 67 is biased by a spring 71 toward the position shown in FIG. 2, which comprises its "normal" position providing relatively little pressure drop in the conduit 25.

The restrictor valve 65 is biased by a pilot signal 73 toward a "flow restriction position", in which the restrictor valve 65 is able to restrict the flow of fluid through the outlet conduit 27. Preferably, the restrictor valve 65 is equipped with a suitable anti-cavitation check valve, to permit flow from the pilot signal line 73 to the outlet conduit 27, and is also provided with suitable relief valve means neither the check nor the relief being shown, for ease of illustration. The pressure reducing valve 67 has its position controlled by a pilot valve 75, which is biased by a spring 77 toward the position shown in FIG. 2 in which a pilot line 79 is drained to a system reservoir 81. It should be noted that the pilot valve 75 is not proportional, but instead, is an "ON-OFF" valve, being shown in its OFF position in FIG. 2. The pilot valve 75 is biased toward its ON position by the same pilot signal 73 which biases the restrictor valve 65. When the input signal 61 is energized, the pilot valve assembly 59 is actuated, and control pressure 83 from a charge pump 85 is communicated through the pilot valve assembly 59, thus providing a pressurized pilot signal 73 which is operable to overcome the springs 69 and 77. When the pilot signal 73 biases the pilot valve 75 to its ON position, a pressure is communicated from downstream of the pressure reducing valve 67 by means of a conduit 87, with this downstream pressure biasing the pressure reducing valve 67, in opposition to the biasing force of the spring 71. In other words, the greater the pressure downstream of the valve 67 the more the valve 67 will reduce the pressure in the inlet conduit 25, for reasons to be explained subsequently.

OPERATION

Figure 3:
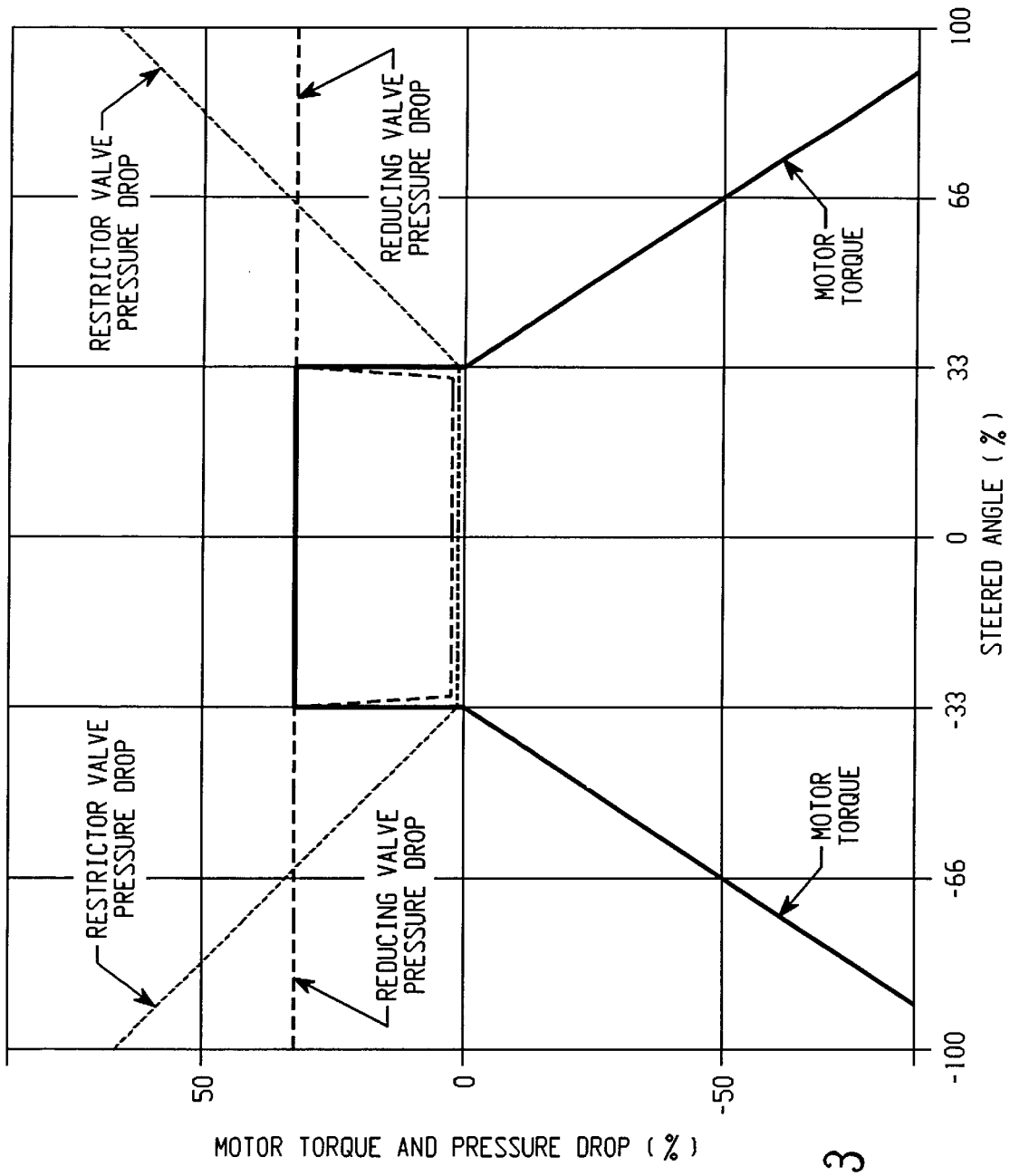
FIG. 3 is a graph of motor torque and pressure drop, as a function of vehicle steered angle, illustrating the control of the present invention.

Referring now primarily to FIGS. 2 and 3, whenever the vehicle is moving straight ahead, or is turning left, or is turning right, but at less than a predetermined minimum angle, the input signal 61 is de-energized, there is no pilot signal 73, and both the restrictor valve 65 and the pressure reducing valve 67 are in their normal positions, as shown in FIG. 2. In this position, flow through the outlet conduit 27 is not restricted, and there is no substantial pressure drop generated in the inlet conduit 25. Therefore, the drive motor 13, driving the wheel 11 on the right side of the vehicle, operates in its normal manner. In the subject embodiment, and by way of example only, this normal manner of operation will occur as long as the vehicle is in a right turn which is less than 33% of maximum steered angle. As may be seen in FIG. 3, between 0% and 33% in a right turn (or in a left turn) both the Restrictor valve pressure drop (dotted line) and Reducing valve pressure drop (dashed line) are substantially zero. In this condition, the Motor torque (solid line) is at its normal level, shown in FIG. 3, by way of example, as being about 30% of maximum motor torque.

As the Steered angle reaches 33%, an appropriate signal is transmitted over the signal line 53 to the vehicle controller 21. The input signal 61 is energized, and the pilot valve assembly 59 moves upward in FIG. 2, and begins to generate a pilot signal 73 which is generally proportional to the extent to which the Steered angle exceeds the 33% threshold. As the pilot signal 73 begins to build, the pilot valve 75 quickly shifts to its ON position, communicating the conduit 87 to the pilot line 79, to move the pressure reducing valve 67 toward its pressure reducing position. By way of example only, the pressure in the inlet conduit 25, downstream of the pressure reducing valve 67 may be about 300 psi., while the pressure upstream of the reducing valve may typically be about 4000 psi. As this pressure drop across the valve 67 occurs, the Motor torque quickly drops to zero, as shown in FIG. 3. At the same time, the building pilot signal 73 begins to bias the restrictor valve 65 in opposition to the biasing force of the spring 69, causing the pressure drop across the restrictor valve 65 to increase.

The increasing restriction to flow offered by the restrictor valve 65, in combination with the reduced pressure in the inlet conduit 25, results in a situation wherein the pressure is higher in the outlet conduit 27 than in the inlet conduit 25, (i.e., the motor 13 begins to act as a pump) and Motor torque begins to go negative in FIG. 3, i.e., a reverse torque is applied to the motor 13. One result may be that the wheel 11 on the right side begins to "scrub" the ground, and when such scrubbing of the wheel happens, it is possible for the vehicle to make a turn on a radius less than the kinematic turning radius. As may be seen in the graph of FIG. 3, the greater the Steered angle, the greater the restriction of the valve 65, and the greater the negative magnitude of the Motor torque on the motor 13. Although FIG. 3 illustrates the relationship between Restrictor valve pressure drop and Motor torque as being generally linear, those skilled in the art will understand that such is not necessary, and the relationship can be tailored as desired for the particular vehicle. Also, the 33% threshold is merely by way of example, and instead of the pressure drops being substantially zero until the 33% threshold, the pressure drops could begin to build gradually as soon as steering commences, or soon thereafter.

Figure 4:
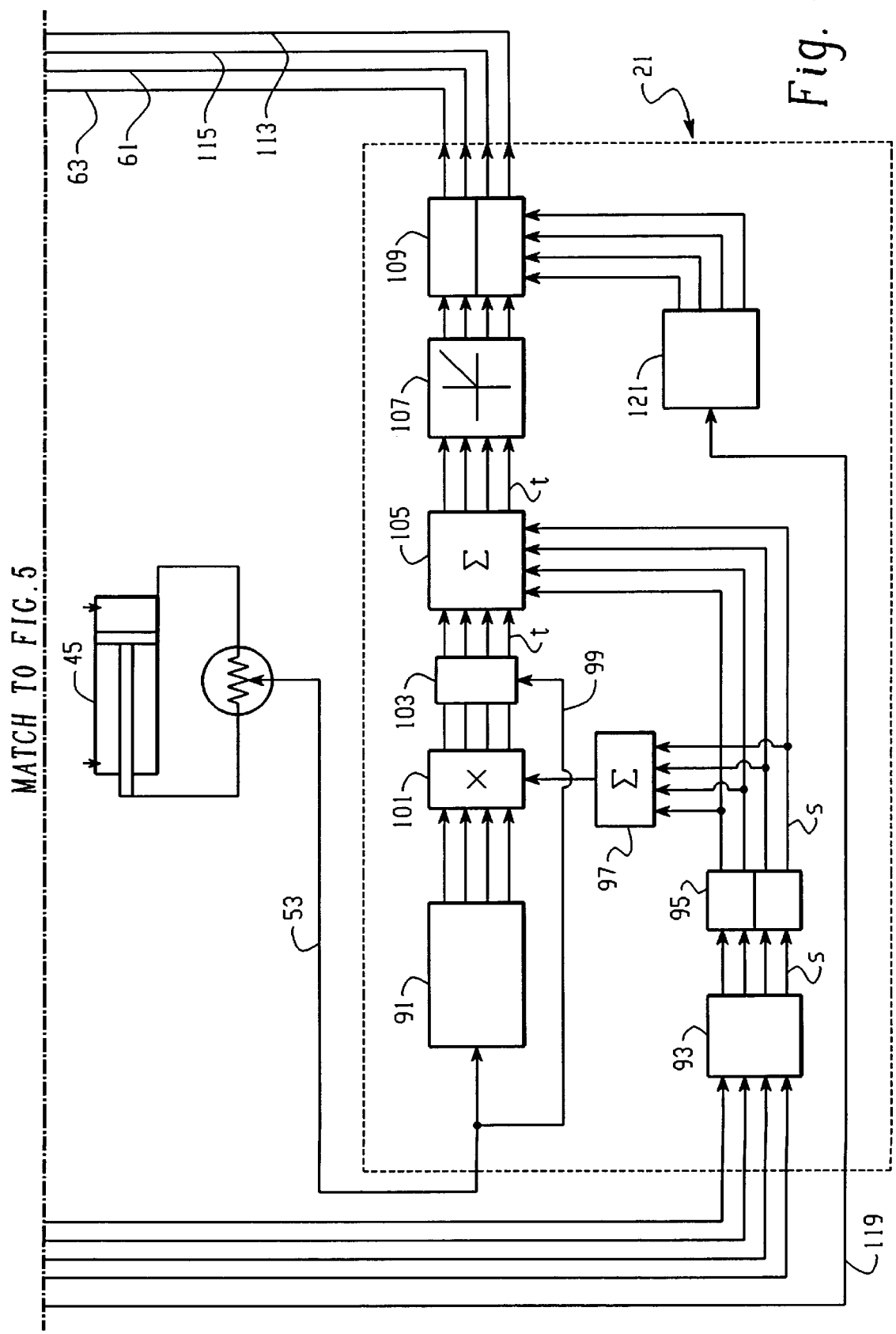
FIG. 4 is a logic diagram illustrating an algorithm comprising one aspect of the present invention.

Referring now primarily to FIG. 4, the vehicle controller 21 will be described in some detail, in terms of the logic utilized. As noted previously, one of the inputs to the controller logic 21 is a signal 53 representative of the position of the steering cylinder 45 which is also representative of the extent of turning of the vehicle (i.e., the deviation from the normal, straight ahead movement of the vehicle). The steering angle signal 53 is the sole input to an operation block 91 which calculates the "fractional" wheel flows (i.e., the flows to the drive motors 13 and 15, based upon a knowledge of the instantaneous steering angle of the vehicle). For example, assuming that all four of the drive motors 13 and 15 are of the same displacement, if the steering angle is zero (i.e., the vehicle is moving straight ahead), each of the fractional wheel flows will be 25%. It should be noted that the calculation of fractional wheel flows is based upon the assumption of "kinematic" operation, i.e., perfect rolling engagement of each wheel 11 or 14 with the ground (no slipping or scrubbing of any of the wheels).

If, as a further example, the vehicle has begun a right turn, the fractional wheel flow for each of the drive motors 15 may still be 25%, whereas the fractional wheel flow for the left drive motor 13 (for the outside wheel) will begin to increase above 25%, while the fractional wheel flow for the right drive motor 13 (the inside wheel) will begin to decrease below 25%.

Additional inputs to the vehicle controller 21 are wheel speed signals from each of the front drive wheels 11 and each of the rear drive wheels 14. The four wheel signals are the four inputs to an operation block 93 in which the wheel speed signals, which would typically be expressed in pulses per unit time, are converted into actual wheel speeds. These wheel speed signals are then transmitted to an operation block 95 in which the wheel speeds are converted into wheel motor flows, based upon knowing the displacement of each of the motors 13 and 15. In addition, in the event that the displacement of the front drive motors 13 is different than the displacement of the rear drive motors 15, that difference can be programmed into the operation block 95. The four signals representative of the wheel motor flows are transmitted first to an operation block 97 which sums the four inputs to generate a total wheel motor flow signal 99, the signal 99 then being one of the inputs to an operation block 101 which multiplies the total wheel motor flow by each of the fractional wheel flows to generate four signals which represent the computed or theoretical wheel motor flow for each of the wheel motors 13 and 15.

The four outputs of the operation block 101, which are the calculated or theoretical wheel motor flows, serve as inputs to an operation block 103, which also receives as an input the steering angle, as transmitted by the signal line 53. In the operation block 103, the 33% threshold value illustrated in the graph of FIG. 3 would be stored. If the actual steering angle is less than the 33% threshold, the operation block 103 would merely allow the theoretical wheel motor flow values to be transmitted, unchanged, to an operation block 105. The function of the operation block 105, when the steering angle is below 33%, will be described in connection with the alternative embodiment of FIG. 5. However, if the steering angle equals or exceeds the 33% threshold, the theoretical wheel motor flow is compared to the actual flow through the wheel motor for the inside wheel, and among the four outputs of the operation block 105 is an "error" signal for that particular wheel motor.

The four output signals from the operation block 105 are transmitted to an operation block 107 in which the wheel motor flow error signal for the inside wheel is converted into a signal which is the basis for the appropriate input signal 61 or 63, depending upon the direction of turning of the vehicle. Each of the outputs of the operation block 107 is then transmitted to an operation block 109, the prime function of which is signal conditioning, and which will be described in greater detail subsequently. The outputs of the block 109 include the input signals 61 and 63 shown in FIGS. 1 and 2.

FIG. 5 Embodiment

Referring now to FIG. 5, in conjunction with FIG. 4, an alternative embodiment of the invention will be described. The vehicle hydraulic schematic shown in FIG. 5 includes many of the elements shown in FIGS. 1 and 2, which will bear the same reference numerals in FIG. 5. The system shown in FIG. 5 may be viewed either as an alternative system, or as the same system as shown in FIGS. 1 and 2, but operating at a different point in time, or under a different set of conditions, as will be explained in greater detail subsequently.

Although each of the front wheel motors 13 in FIG. 5 may be provided with the same motor control valve 55 shown in FIGS. 1 and 2, all that is shown in FIG. 5 is the proportional restrictor valves 65. It should be noted that in the system of FIG. 5, each of the rear wheel motors 15 is also provided with one of the proportional restrictor valves 65, disposed on the "downstream" side of the motor 15, assuming operation of the vehicle in the normal, forward direction.

Each wheel 11 or 14 (or more accurately, the drive axle associated therewith) is provided with a wheel speed sensor 111, the function of which is to transmit the appropriate instantaneous wheel speed signal for its respective wheel to the operation block 93 of the vehicle controller 21, as was described previously.

In the system of FIG. 5, it will be assumed for simplicity that the displacement of the wheel motors 13 and 15 is the same, and therefore, it will not be necessary for the operation block 95 to modify the four wheel speed signals it receives to compensate for different motor displacements.

In operation, with the vehicle moving straight ahead and all four of the wheels 11 and 14 maintaining kinematic relationship with the ground (no slipping or scrubbing) all four of the signals from the wheels speed sensors 111 will be identical and all four of the outputs from the operation block 91 will be 25%. The actual wheel motor flows which are the outputs from the operation block 95 are summed at the operation block 97 and multiplied at the operation block 101, as described previously, such that the outputs from the block 101 will all be the same, each indicating the same theoretical flow to the respective wheel motor. In the operation block 105, the theoretical wheel motor flows are compared to the actual, and at ideal, kinematic operation, the result will be four error signals from the block 105 which are all zero. These error signals are fed to the operation block 107, all of the outputs of which are zero, as are the input signals 61 and 63 to the front wheel motor restrictor valves 65. The system of FIGS. 4 and 5 also includes a pair of input signals 113 and 115, connected to the restrictor valves 65 associated with the right and left rear wheel motors 15, respectively.

It should be noted that in the embodiment of FIG. 5, the restrictor valves 65 are illustrated as being electromagnetic solenoid valves, directly driven by the various input signals 61, 63, 113, and 115. In the embodiment of FIGS. 1 and 2 the input signals were directed to pilot valves which generated appropriate pilot signals for controlling the restrictor valves 65, and those skilled in the art will understand that within the scope of the invention either of these arrangements, or combination thereof, could be used to accomplish the intended purpose.

Assuming now, for purposes of explanation, that the right rear wheel 14 has begun to spin out, the operation of the invention will be described. As the right rear wheel 14 begins to spin out, the flow through the associated wheel motor 15 will increase, while the actual flows through the other three wheel motors will decrease, as is understood by those skilled in the art. As a result, the actual wheel speed signals out of the operation block 93 will no longer be the same, but instead, the output labeled "S" (for spin out) in FIG. 4 will be greater than it was previously, while all of the others are somewhat less than they were previously, when the vehicle was operating at ideal, kinematic conditions. The signals out of the operation block 101 still indicate that the theoretical wheel motor flows should all be equal, because the vehicle is still moving in a straight ahead direction (steering angle equals zero). At the operation block 105, the comparison for the three wheels which are not spinning indicates that theoretical wheel motor flow is somewhat greater than actual, thus generating a negative error signal as inputs to the operation block 107. However, in regard to the right rear wheel which is spinning out, the actual wheel motor flow is greater than the theoretical, thus producing a positive ("+") error signal as an input to the operation block 107. The block 107 is designed to operate only on positive error signals as inputs. In other words, the system as shown in FIGS. 4 and 5 cannot do anything if a particular wheel motor is receiving too little fluid, and the wheel is going too slow. However, when one of the error signals is positive, the operation block 107 generates a signal (also bearing the reference numeral "107"), proportional to the amount of error and transmits that signal to the operation block 109.

It should be noted in FIG. 5 that a pressure sensor 117 is associated with the pump 17, and transmits to the vehicle controller 21 a pressure signal 119 representative of the pressure differential across the pump 17. The pressure signal 119 is transmitted to an operation block 121, which may actually comprise a lookup table, in which various gains and biases are generated/selected as a function of the pressure across the pump 17. In the subject embodiment, the outputs of the block 121 include a forward gain, a forward bias, a rear gain, and a rear bias, and those outputs are transmitted to the operation block 109 in which the various outputs from the block 107 are "conditioned" as is well known to those skilled in the art to generate the actual input signals to the restrictor valves 65. In the example being given, the outputs of the block 109 will include signals 61, 63, and 115 which are all zero, and a signal 113 which is proportional to the amount of spinout of the right rear wheel 14.

The signal 113 is transmitted to the restrictor valve 65 downstream of the motor 15 for the right rear wheel, and because the valves 65 are proportional, the valve moves in response to the signal 113 to begin to restrict flow through the wheel motor. This restriction of flow through the wheel motor of the spinning wheel will continue until all of the error signals out of the operation block 105 have been nulled, indicating that all of the actual wheel motor flows are again equal to the theoretical flows.

Although the system of FIGS. 4 and 5 have been described in connection with only one motor spinning out, while the vehicle is moving straight ahead, it will be understood that the operation of the system would be substantially as described even if two wheels are spinning out at the same time, or even if wheel spinout occurs while the vehicle is in a turn.

As described in the BACKGROUND OF THE DISCLOSURE, another problem encountered by vehicles of the type to which the invention relates is when hydrostatic braking is used, and the vehicle is going down hill. One result of going down hill is that there is less loading on the rear wheels and more loading on the front wheels. When hydrostatically braking, each of the motors operates as a pump and the pump operates as a motor. The maximum hydrostatic braking is typically limited by the rear wheel traction, and if slip occurs between a rear wheel (assume the right rear in FIG. 5), and the ground, scrubbing will occur as the vehicle moves faster than the linear velocity of the wheel. To prevent scrubbing in the situation described, the logic transmits the pressure signal 119 to the operation block 121, but because of the vehicle going down hill, the signal 119 is now negative. The logic utilizes the negative signal 119 at the block 121 to generate outputs from the block 121 to the block 109 which result in the actuation of the restrictor valves 65 associated with the front wheel motors 13, and possibly the restrictor valve 65 associated with the left rear wheel motor 15. Thus, the flow will be restricted through the two or three wheel motors for the wheels which were not scrubbing and the pressure will be reduced on the downstream side of the wheel motor for the right rear wheel which was scrubbing. This will cause the two or three wheel motors for the wheels which were not scrubbing to reduce speed until the right rear wheel is again turning at a kinematically correct speed, i.e., it is no longer scrubbing.

It may be seen that the present invention provides a vehicle hydraulic drive system, and a method for controlling such a system in which kinematic wheel motor flows are determined, and compared to actual wheel motor flows, and if the vehicle is at a predetermined minimum steering angle, flow through the inside wheel is restricted to scrub the wheel and decrease the turning radius. At the same time, if any particular wheel spins out, the comparison of actual wheel motor flow to theoretical results in restricting flow through the wheel motor of the spinning wheel to restore the normal kinematic relationship. Finally, if any particular wheel scrubs, the comparison of actual wheel motor flow to theoretical results in restricting flow through the motors of the wheels which aren't scrubbing, slowing them down to again restore the normal kinematic relationship.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of controlling a vehicle hydraulic drive system of the type comprising a source of pressurized fluid, a plurality of fluid pressure actuated motors connected in a parallel circuit with said fluid source; a driven wheel drivingly associated with each of said motors whereby said driven wheels are driven at varying speeds in response to varying rates of fluid flow to each of said motors; a source of control fluid pressure; each of said motors including an inlet conduit disposed upstream of said motor, and an outlet conduit disposed downstream of said motor when the vehicle is moving in a normal forward direction, the method being characterized by:

(a) providing a proportional flow restrictor valve disposed in said outlet conduit of each of said plurality of motors;
    (b) determining the theoretical fluid flow for each of said motors, the cumulative theoretical flow for all of said motors, and the instantaneous theoretical fractional flow for each of said motors;
    (c) determining the actual fluid flow through each of said motors driving one of said driven wheels;
    (d) calculating a wheel flow error for each of said driven wheels representative of the difference between said theoretical fluid flow for each of said motors and said actual fluid flow through each of said motors; and
    (e) generating a pilot signal representative of said wheel flow error and transmitting said pilot signal to said restrictor valve, biasing said restrictor valve from a normal position providing generally unrestricted flow toward a flow restriction position.

2. A method as claimed in claim 1, characterized by the vehicle drive system comprising means operable to effect turning of the vehicle independently of the operation of the motors.

3. A method as claimed in claim 1, characterized by said step (a) further comprising the steps of providing a pressure reducing valve disposed in said inlet conduit of each of said plurality of motors and transmitting said pilot signal to said pressure reducing valve, biasing said valve from a normal position, providing a general pressure drop, toward a pressure reducing position.

4. A method as claimed in claim 1, characterized by said step (b) further comprising the step of sensing the extent of turning of the vehicle and modifying the theoretical fluid flow for each of said motors to generate a modified instantaneous theoretical fractional flow for each of said motors corresponding to said sensed extent of turning of the vehicle.

5. A method as claimed in claim 1, characterized by determining when the vehicle has deviated from the normal, straight ahead direction by a predetermined, minimum turning extent, determining the driven wheel about which the vehicle is turning, generating said pilot signal representative of the extent of turning of the vehicle in excess of said predetermined, minimum turning extent, and transmitting said pilot signal to both said restrictor valve and said pressure reducing valve.

6. A method as claimed in claim 1, characterized by step (b) including the further step of modifying the instantaneous theoretical fractional flow for each of said motors in response to a steering input command signal to effect turning of the vehicle by controlling the fluid flow through said wheel motors.

7. A method as claimed in claim 1, characterized by the additional step of sensing a pressure differential across said fluid source, and if the sensed differential indicates hydrostatic braking, and actual fluid flow through one of said motors is less than the theoretical fluid flow for that particular motor, generating said wheel flow error for each of the other driven wheel motors tending to bias said restrictor valve toward a flow restriction position.

8. A vehicle hydraulic drive system for driving a pair of driven wheels of a steerable vehicle, said drive system being of the type comprising a source of pressurized fluid, and a fluid pressure actuated motor operable to drive each of said driven wheels at varying speeds in response to varying rates of fluid flow to said motor from said fluid source, said motors being connected in a parallel circuit with said fluid source; a source of control fluid pressure; each of said motors including an inlet conduit disposed upstream of said motor, and an outlet conduit disposed downstream of said motor when the vehicle is moving in a normal forward direction, characterized by:

(a) each of said motors having a control system including a proportional flow restrictor valve disposed in said outlet conduit, and a pressure reducing valve disposed in said inlet conduit;

(b) pilot valve means in fluid communication with said source of control fluid pressure and operable to generate a pilot signal whenever at least a predetermined, minimum turning of the vehicle occurs; and (c) said pilot signal being operable to bias said pressure reducing valve from a normal position, providing a general pressure drop toward a pressure reducing position, and to bias said proportional flow restrictor valve from a normal position, providing generally unrestricted flow toward a flow restriction position.

9. A vehicle hydraulic drive system as claimed in claim 8, characterized by means operable to effect turning of the vehicle independently of the operation of said motors.

10. A vehicle hydraulic drive system as claimed in claim 8 characterized by said means operable to effect turning of the vehicle comprises a steering cylinder, and a hydrostatic fluid pressure steering control unit operable to communicate pressurized fluid to said steering cylinder in response to rotation of a vehicle steering wheel.

11. A vehicle hydraulic drive system as claimed in claim 8 characterized by a steering sensor operably associated with one of said steering cylinder and said vehicle steering wheel and operable to generate a steering signal representative of the turning of the vehicle.

12. A vehicle hydraulic drive system as claimed in claim 8 characterized by said predetermined minimum turning of the vehicle comprises the vehicle deviating from the normal, straight ahead direction by at least about 33 percent of maximum vehicle steering angle.

13. A vehicle hydraulic drive system as claimed in claim 8 characterized by said flow restriction position of said flow restrictor valve and said pressure reducing position of said pressure reducing valve being selected such that said motor is subjected to a negative torque.

14. A vehicle hydraulic drive system as claimed in claim 8 characterized by said pressure reducing valve includes a first biasing means operable to bias said pressure reducing valve toward said normal position, and said flow restrictor valve includes a second biasing means operable to bias said restrictor valve toward said normal position.

15. A vehicle hydraulic drive system as claimed in claim 8 characterized by said first biasing means exerting a lesser biasing force than said second biasing means, whereby said pilot signal switches on said pressure reducing valve toward said pressure reducing position before beginning to move said flow restrictor valve toward said flow restriction position.

* * * * *